Jan. 14, 1947.    G. B. RHEINFRANK, JR    2,414,125
STRUCTURAL MATERIAL FOR AIRCRAFT
Filed June 25, 1943    2 Sheets-Sheet 1
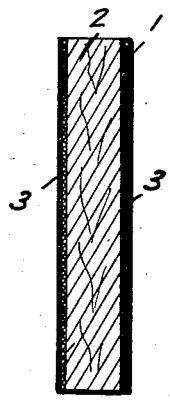
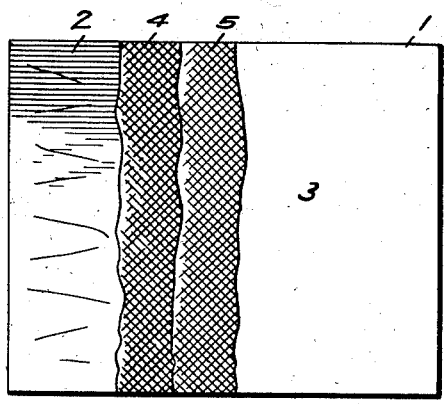
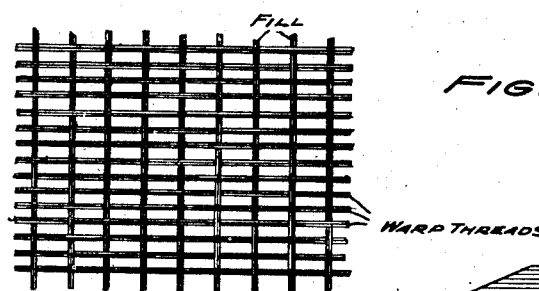
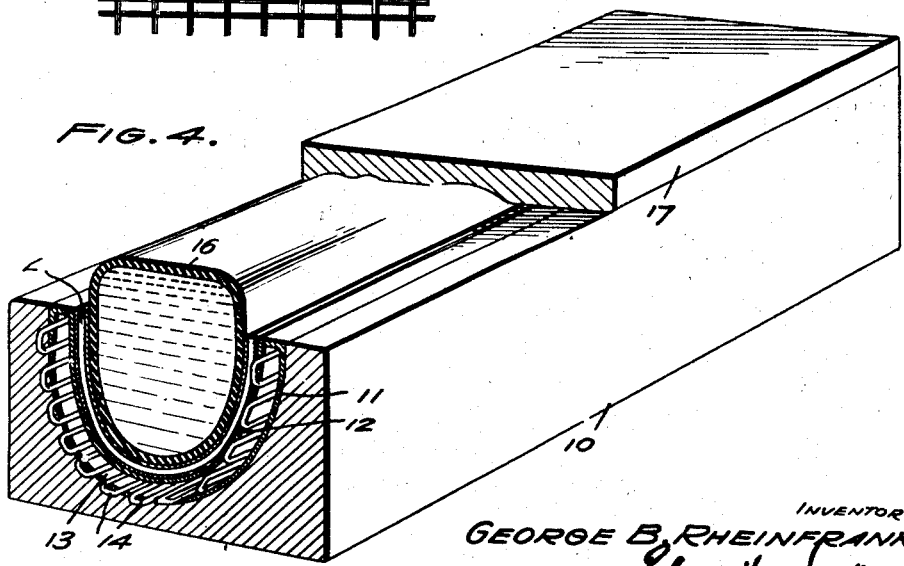
INVENTOR
GEORGE B. RHEINFRANK, JR.
BY
ATTORNEYS Jan. 14, 1947. G. B. RHEINFRANK, JR 2,414,125
STRUCTURAL MATERIAL FOR AIRCRAFT
Filed June 25, 1943 2 Sheets-Sheet 2

Patented Jan. 14, 1947

2,414,125

UNITED STATES PATENT OFFICE 2,414,125

STRUCTURAL MATERIAL FOR AIRCRAFT

George B. Rheinfrank, Jr., Perrysburg, Ohio

Application June 25, 1943, Serial No. 492,309

7 Claims. (Cl. 154—75)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a novel, composite, light-weight structural material, and to a method of making the same.

Thin sheet metal stressed skin construction is now widely employed in aircraft construction but has many disadvantages from a strength-weight standpoint due to the fact that it is necessary to locally reinforce the skin by bulkheads and stiffeners to prevent buckling under shear stress, and it is very difficult to work the material at stresses anywhere near approaching its ultimate strength because of failure due to secondary stresses arising from buckling or the like. It has long been known that the ideal construction of aircraft components loaded in torsion or as beams or columns having high slenderness ratios, would be to employ thin sheet metal spaced at a maximum distance from the axis of flexure or torsion to carry the bending, column, and torsional loads and supporting the thin sheet throughout by an internal structure made of a very low density material so that the metal sheet would be free from liability to failure due to buckling. A general discussion of the advantages of such a construction and suggested constructional forms are discussed in the text, "Mechanics of Aircraft Structures," by John E. Younger, published 1942 by McGraw-Hill, pages 77 to 82 inclusive. The prior art proposals along this line however raise the constructional difficulty of forming large metal sheets and the further problem of bonding such sheets to a low density core or framework made of wood.

It has further been a practice in the prior art to construct aircraft from a composite multi-ply material in which a low density core material such as balsa wood is covered on each side with birch plywood glued to the core material. This form of construction is good from a strength-weight ratio standpoint but has several disadvantages in that suitable plywood is not a homogenous material and its moisture absorption properties require protective coatings and after fabrication must be carefully tailored for fit prior to gluing to the core material, which entails a very high labor and time expenditure. Further difficulties arise due to the necessity of steaming the plywood to form curves and very definite bending limits permit only a very moderate compound curvature. A further difficulty arises in that considerable pressure is required to make the face ply material conform to the shape of the core material when placed in a mold causing distortion of the core, and in addition high gluing pressure is required to obtain the necessary glue penetration to secure a good bond to the plywood facing which tends to crush the core material or to markedly increase its density. The cost of the plywood coupled with the difficulty encountered in assembly renders this method of little advantage on a cost and man hours basis over conventional metal construction.

The prior art has also employed molded plywood glued to a supporting framework, but the time required in cutting the plywood for an accurate fit, the necessity for employing high pressure for successful molding of compound curved surfaces coupled with serious limitations as to curvatures which can be employed, and the necessity for additional surface protection has rendered this process much more expensive than was originally contemplated and presents little net saving over conventional metal construction.

The present invention provides a means whereby a high strength material can be employed as a primary stress-carrying element and suitably supported by a low density material, such that the composite material will have a low average density and a very high strength-weight ratio and is further characterized by the fact that limitations as to forming curvature are removed and protective finishes are not required because of low moisture-absorption qualities.

In accordance with the present invention a low density core material such as balsa wood, or other materials hereinafter specified, is shaped to a contour substantially as in the finished article. A high strength surface material such as glass fibre cloth or other material as hereinafter specified, is then laid up in a plurality of layers on each side of the core material, the cloth being coated with a suitable synthetic resin impregnating and adhesive compound having low pressure and temperature characteristics, as the layers of the same are laid up. The core and face plies are then preferably arranged in a suitable mold and heat and a low molding pressure applied until the resin has cured. During the curing process the resin completely fills the interstices in the cloth and at the same time the face plies are securely bonded to the core material. The completed composite material is characterized by the fact that it has a hard smooth surface which requires no further treatment and the material has a high strength-weight ratio and low moisture-absorbing properties. The main distinguishing feature of the invention is the use of a primary load carrying face ply material which develops a substantial part of its maximum strength without consolidation by compression and which, when applied in the form of a mat or cloth, gives a surface which can be caused to adhere to the core material without its being necessary to employ high gluing pressure. The fact that the facing material is applied in a cloth or mat form enables it to assume any desired curvature or form without requiring preliminary tailoring and steaming so that complex shapes not within the scope of conventional plywood can be molded. The fact that the surface material is impregnated and caused to adhere simultaneously to the core material, and the lack of any difficulties in fabrication, render it possible to make great savings in the man hours of labor required to manufacture aircraft components and to effect substantial net savings over metal construction.

It is therefore the principal object of the present invention to provide a composite multi-ply structural material particularly suited for use in aircraft, which consists of employing a low density core material faced with a high strength facing material of a fibrous nature having a high optimum strength in its uncompressed state and simultaneously impregnating and bonding the facing material to the core material under pressure of a low order insufficient to cause any crushing or material increase in density of the core material.

A further object of the invention is the improved method of fabricating a composite multi-ply material of the character described which includes the steps of simultaneously impregnating and bonding the fibrous surface ply material to the core by application of a low pressure and a minimum curing temperature.

Another object of the invention is the provision of a composite multi-ply material comprising a central core of wood or other material of low density and faced with a high strength, high density material in a fibrous form impregnated with a synthetic resin adhesive and bonded to the core by application of heat and pressure sufficiently low to not increase the density of the core material.

Other features and objects of the invention will become apparent by reference to the detailed description hereinafter given and to the appended drawings in which:

Fig. 1 is an end sectional view illustrating a panel made in accordance with the invention;

Fig. 2 is a side elevation of the panel of Fig. 1 with the multi-ply construction illustrated;

Fig. 3 is an exaggerated fragmentary view showing the relative number of threads in the warp and fill of a high strength woven facing material employed in one form of the invention.

Fig. 4 is an isometric sketch, partly in section, illustrating the molding of one half of an aircraft fuselage;

Figure 5:
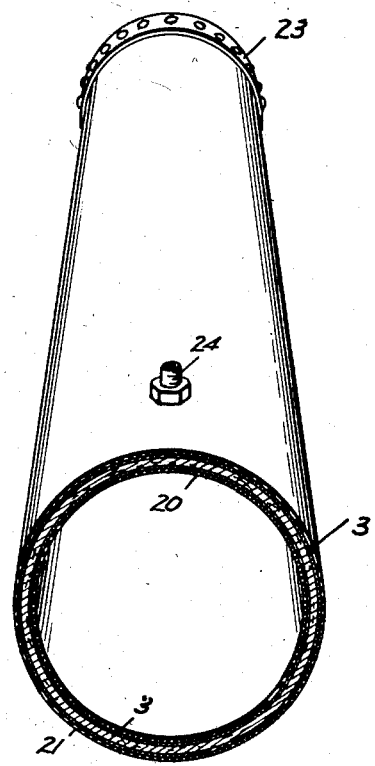
Fig. 5 is a view similar to Fig. 4 illustrating a method of vacuum molding without the use of male or female mold forms.

Referring now to Figs. 1 and 2 the reference numeral 1 generally indicates a composite multi-ply panel incorporating the invention and including a core 2 having a thickness equal to a major part of the thickness of the completed panel, the core being a low density material such as balsa wood, basswood, cork, foamed synthetic materials such as cellular cellulose acetate, cellulose sponge, and fibrous materials such as glass fibres, straw, flax, ramie or the like. I have found that balsa wood having a specific gravity of about .11 forms an excellent core material because of its excellent strength-weight ratio and contributes considerably to the strength of the final construction.

The core material 2 is covered on each of its side faces by one or more plies of a high strength, high density, load carrying material generally indicated by the reference numeral 3. The individual plies are indicated, as illustrated in Fig. 2, by reference characters 4 and 5. The individual plies 4—5, etc. of the facing material 3 are preferably made in the form of a cloth such as illustrated in Fig. 3 in which the warp threads are approximately twice the number of the woof or filler threads, a typical example being warp, 30 threads per inch, and fill and woof, 16 threads per inch, so that the cloth has a maximum strength in the direction of the warp threads. By arranging the angles between the planes of the warp threads in each superimposed fabric layer, the axis of greatest strength in the completed panel may be controlled, the direction of the warp threads in alternate plies may make an angle of 45° with each other to get a substantially equal strength in each direction in the completed panel, the warp threads may be parallel in each ply or make any desired angle to resist tension, compression or shear stresses in particular planes or to obtain optimum resistance to all applied loads. Further by use of a cloth material the warp threads may be arranged in curves such that the axis of maximum strength may conform to the axis of the principal stress at various critical points in the aircraft component of which it forms a part. While the use of a woven cloth has been above described, good results may be obtained where the fibrous material is formed as a thin bat with the fibres in substantial alignment and retained by stitching at intervals across the bat. The use of the high strength material in the form of a loosely woven cloth is preferred because of ease of fabricating the material in the final assembly. Types of fibrous materials having the necessary property of high strength in the uncompressed state and preferably made into cloth or thin bats as above specified are spun glass fibre, fine metal wire, certain types of high strength synthetic fibres of the nylon or rayon character, and specially processed natural fibres such as flax, cotton and sisal, flax when specially processed being one of the strongest materials known and capable of developing an ultimate strength of 140,000 pounds per square inch and having a ratio of maximum strength to specific gravity in excess of 40. It is essential that the facing material have a high modulus of elasticity so that the required load can be carried without shear failure in the core material, or excessive deflection.

*Types of impregnating and binding materials*

In addition to the character of the fibrous material used to develop high strength, the nature of the bonding material and the molding or final fabrication are very important and suitable impregnating or binding materials are as follows:

"Plaskon" No. 700 urea resin product, manufactured by Libby-Owens-Ford, Toledo, Ohio, Laminex P4122–A, a styrene resin composition manufactured by the American Cyanamid Company, New York city, Bakelite Phenolic No.

BV16238, a phenol formaldehyde product; "CR-39," an allyl alcohol made by Marco Chemical Corporation, Philadelphia, Pennsylvania; are a few of the possible low pressure bonding materials which are satisfactory and capable of application in a liquid form. In general any of the modified urea, phenol formaldehyde, styrene and melamine resins which can be preferably applied by spraying, brushing or dipping and cured under pressures varying from zero to a maximum of 100 pounds per square inch and at temperatures not exceeding 325° Fah. can be used, such resin compositions being readily commercially available.

Fabrication and molding

The multi-ply material illustrated in Figs. 1 to 3 inclusive may be fabricated into panels or molded into various forms such as shell wings and monocoque fuselages, and the fabrication into panels will be first described.

Core material of the character above described and finished to dimensions has a first layer of the facing material laid thereon, which material has previously been coated with one of the bonding and impregnating compositions above noted, and with the axis of the fibres in the desired direction as dictated by strength considerations. Additional layers of the facing material are then laid up with the proper relation of warp fibre orientation and coated by brushing or spraying on the impregnating material as each succeeding layer is laid up. A metal caul is then applied over the last ply of facing material and the assembly turned over and the facing material applied to the other face of the panel and a metal caul applied and the assembly placed in a press where the requisite heat and pressure is applied. The temperature is primarily dictated by the type of synthetic resin impregnating material used, while the limiting pressure is determined by the character of the core material employed. For example, with balsa wood a pressure of 4 p. s. i. is desirable and preferably should not exceed 10 p. s. i., while with a core material of basswood a pressure of 50 to 100 p. s. i. might be employed; but in any event the pressure must be kept as low as possible consistent with the type of impregnating material employed, so that no appreciable crushing or increase of density of the core material takes place. As the pressure is applied, the impregnating material fills the interstices of the facing material and simultaneously causes a bonding of the plies of facing material to each other and the facing assemblies to the core material. After the heat and pressure are applied for a time sufficient to cure the resinous binder, the panel may be removed from the press and a suitable synthetic resin material applied to the panel end faces to seal the core material against absorption of moisture. The finished panel is characterized by low weight, extreme rigidity, and glossy smooth surface which requires no additional finishing. The data on a typical panel is as follows:

Core $3/8$" balsa wood, S. G. .11
Facing 4 plies each side .01" glass fibre cloth
Impregnating material—"Laminax" P4122-A brushed on as layers of cloth facing laid up.
Pressure 4 p. s. i.—Temp. 230° F.
Tested 5000 p. s. i. in compression, size of sample 2" x 3" with load applied along 3" dimension as compared with a similar specimen faced with $1/16$" 2 ply birch which developed a compressive strength of 1100 p. s. i.

Molding procedure

Because of the fact that the face plies 4-5, Figs. 1 and 2, are initially in a non-compressed and limp state, molding of the high strength structural material is readily accomplished, and compound curvature creates no difficulty such as occurs in the molding of plywood.

One molding procedure is illustrated in Fig. 4 in which one half shell of a monocoque fuselage is being formed. The mold comprises a base 10 made from concrete or the like lined with a metal trough 11, and a metal female mold 12 is secured to the upper marginal edges of the trough 11 to leave a space 13 therebetween, in which are arranged a series of heating pipes 14 through which hot water or steam may be circulated to heat the mold 12 to effect curing of the resin impregnated material on the outer face of the core. The mold 12 is constructed such that its inner contour conforms to the outer shape of the fuselage half shell, and the outer face plies of the composite fuselage half shell are laid up in the mold, each ply being coated with the desired impregnating material. The core material 2 is then placed in the mold, the same having been previously machined to substantially its completed form and edge glued into a core assembly, or the components suitably coated with binder and laid up in abutting relation. The inner face plies are then laid up on the inner face of the core material and a rubber bag 16 placed in the mold assembly in contact with the inner face plies, and a lid 17 is placed over the open side of the mold and clamped to the base 10. Hot water under the requisite low pressure and at the proper curing temperature is forced into the bag 16, which then forces the core and face plies to assume the shape determined by the mold 12. Steam or hot water at the proper temperature is passed through the heater coils 14 so that both faces of the fuselage will be heated simultaneously, and the heat is applied until the resin binder material is cured, the completed fuselage half shell then being removed from the mold and being assembled by edge gluing and suitable joint reinforcing to a similar opposite half shell to form the completed fuselage.

A further method of molding having particular advantages where the size of the components permits, is a vacuum bag process which due to the nature of the improved material in accordance with the invention, permits great savings in cost by eliminating male or female mold forms and in this respect differs from the prior art. According to this method as illustrated in Fig. 5, the core material 2 for an aircraft fuselage is assembled by edge gluing in substantially its completed form, the requisite number of plies of the facing material 3 is laid up on the inner and outer faces of the core, a rubber sleeve or bag 20 is placed in the center of the assembly and a corresponding rubber sleeve or bag 21 pulled over the assembly externally, the open edges of the bags being clamped together or to sealing rings such as at 23. The space between the bags 20—21 is then evacuated through a suitable connection such as at 24 so that the desired low pressure is applied by the atmosphere external of the bags to the facing material 3 and the entire assembly placed in an oven until the binding and impregnating material is cured. Since the core material can be finish machined and assembled into its final form and no pressure is required to bend the facing material to conform with the core shape, no distortion of the core will occur and hollow shell fuselages may be readily molded in this manner without the use of male or female forms, and further without seams, the facing material being suitably scarfed and overlapped at the joining edges thereof.

Figure 6:
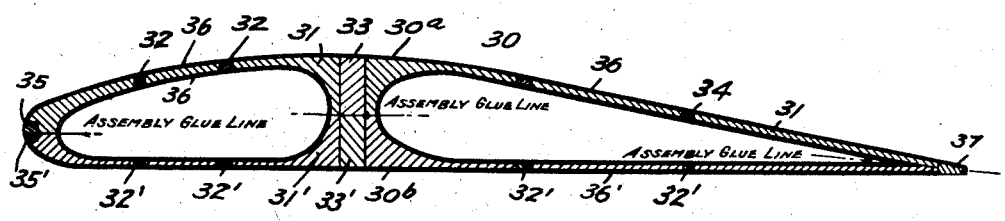
Fig. 6 is a transverse cross sectional view showing the application of the present invention to the wing of an airplane.

Structural material in accordance with the invention is readily adapted to the construction of shell wings for aircraft, one form of which is illustrated in Fig. 6. As seen in Fig. 6, the wing shown in cross section is generally indicated by the reference numeral 30 and includes upper and lower halves 30a and 30b respectively, in which corresponding parts are indicated by the same reference numerals primed in the lower half. Core sections 31—31', of balsa wood or other low density material machined from a master pattern in a duplicating machine, are assembled and edge glued with longitudinally extending shear members of spruce or the like 32—32' and having main spar shear web elements 33—33' of spruce respectively incorporated therein and also including nose members 35—35'. The core assemblies of the upper and lower halves 30a and 30b of the airplane wing 30 are respectively covered with the facing material 36 in accordance with the invention, such as a plurality of layers of synthetic resin coated glass fibre fabric as previously described, and the same cured under heat and pressure as, for example, in the process described with reference to Fig. 5. The upper and lower wing halves are then finally assembled by gluing with cold setting synthetic adhesives along the glue lines as indicated by legends in Fig. 6, at which time a suitable trailing edge 37 of hard wood is applied by gluing with a cold setting synthetic resin adhesive. The final assembly gluing operation is preferably performed in a jig constructed to apply the necessary clamping pressure.

It is to be understood that molding techniques other than those above described may be employed in fabrication of completed assemblies in accordance with the invention. It should also be understood that the invention is not necessarily limited to the use of heat cured synthetic resin bonding and impregnating materials, since certain modified urea formaldehyde compositions, which can be applied in a liquid state, will with the addition of catalysts or hardening agents, cure at room temperatures, though with the same material better results are obtained with application of heat.

It is also believed to be obvious that the novel composite material made in accordance with the invention is not necessarily limited in its use to aircraft.

While preferred constructional features and method of making an improved structural material in accordance with the invention have been illustrated and described, many variations and changes therein will be apparent to those skilled in the art as falling within the scope of the invention as defined in the appended claims.

I claim:

1. A method of making high strength multi-ply skin stressed components of an aircraft comprising the steps of forming a core of a low density material such as balsa wood in the shape of the finished component, draping a high strength high density skin over said core in the form of a loosely woven cloth made from glass fibre, coating the material of the skin with a fluid low pressure synthetic resin, and simultaneously impregnating and bonding the skin to the core by the application of moderate heat and a low pressure, the pressure being of such a low order as not to alter the dimensions or increase the density of the core material.

2. A method of forming a high strength multi-ply structural material for aircraft components comprising forming a rigid core having a shape corresponding to the shape of the finished component, securing a skin of one or more liquid synthetic resin coated layers of a high strength fibrous material in the form of a flexible woven cloth or bat to opposed faces of the core, enclosing the assembly in a bag of rubber or like material such that walls of the bag can contact the skin material, evacuating the bag to a pressure of at least one pound per square inch below atmospheric pressure, and applying heat externally of the bag to set the resin.

3. The method of making a high-strength composite structural material comprising steps providing a pre-formed, low density core of the desired shape, coating the core on opposite faces with the synthetic low pressure bonding material, applying a plurality of layers of high strength fibrous material on the opposed faces of the core, coating said layers of fibrous material with the bonding material, applying a low heat and a low pressure to the facing material to impregnate the same with the bonding material to simultaneously bond the facing to the core, the applied pressure being such as to cause no appreciable increase in the density of the core material.

4. An article of the class described having walls made from a multi-ply high strength material comprising a core of low density material such as balsa wood having a thickness equal to a major portion of the wall thickness and having a shape conforming to the shape of the final article, a high strength facing of at least one layer of glass fibre fabric having interstices between the fibers thereof applied to opposed faces of the core, and a low pressure synthetic resin completely filling the interstices of the fabric, forming a smooth outer surface thereon and binding the fabric to the core.

5. A composite structure suitable for use in skin stressed aircraft construction, comprising a core of low density material such as balsa wood shaped to conform with the shape of the completed member and a primary load carrying skin secured to said core, consisting of a glass fiber fabric having interstices between the fibers thereof, said fabric being characterized by having a high modulus of elasticity and developing a major part of its ultimate strength without consolidation by compression, and a low pressure synthetic resin material completely filling the interstices of the fabric, forming a smooth outer surface thereon and bonding the fabric to the core material.

6. The structure as claimed in claim 5, in which the primary load carrying skin comprises a plurality of glass fabric layers each layer having its principal axis of strength primarily in one direction and the strength axis of each layer making a predetermined angle with respect to a reference axis of the core.

7. The structure as claimed in claim 5, in which the primary load carrying skin comprises a plurality of layers of glass fiber fabric, the principal axis of strength of the fabric in each layer changing from point to point and arranged in a predetermined relation with respect to a reference axis of the core.

GEORGE B. RHEINFRANK, Jr.